(12) United States Patent
Zhang et al.

(10) Patent No.: US 11,265,803 B2
(45) Date of Patent: Mar. 1, 2022

(54) COMMUNICATION METHOD AND COMMUNICATIONS APPARATUS

(71) Applicant: HUAWEI TECHNOLOGIES CO., LTD., Shenzhen (CN)

(72) Inventors: Jun Zhang, Beijing (CN); Wei Li, Dongguan (CN); Yiling Wu, Beijing (CN); Xiaosong Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/987,456

(22) Filed: Aug. 7, 2020

(65) Prior Publication Data
US 2020/0367145 A1    Nov. 19, 2020

Related U.S. Application Data

(63) Continuation of application No. PCT/CN2018/075638, filed on Feb. 7, 2018.

(51) Int. Cl.
*H04W 48/08* (2009.01)
(52) U.S. Cl.
CPC .................... *H04W 48/08* (2013.01)
(58) Field of Classification Search
None
See application file for complete search history.

(56) References Cited

U.S. PATENT DOCUMENTS 11,153,060 B2 * 10/2021 Babaei ................. H04B 7/0617
2016/0353367 A1    12/2016 Vrzic et al.
(Continued)

FOREIGN PATENT DOCUMENTS

CN    106341832 A    1/2017
CN    106375987 A    2/2017
(Continued)

OTHER PUBLICATIONS

Ericsson, "Slice selection cleanup", 3GPP TSG-SA WG2 Meeting #125 S2-181157, (Jan. 26, 2018),total 29 pages.
(Continued)

*Primary Examiner* — Robert M Morlan
(74) *Attorney, Agent, or Firm* — Rimon PC

(57) ABSTRACT

A communication method and a communications apparatus are provided. The communication method includes: receiving a first message from a shared channel of a plurality of network slices, where the first message includes a plurality of network IDs, and the plurality of network IDs are in a one-to-one correspondence with the plurality of network slices; selecting a target network slice from the plurality of network slices; and obtaining access configuration information of the target network slice from network configuration information, and accessing the target network slice based on the access configuration information of the target network slice, where the network configuration information includes a network ID of each of the plurality of network slices and the access configuration information of the target network slice. In this application, a terminal side device may autonomously select and access the target network slice, so that network complexity may be reduced, and a latency in accessing a network may also be effectively reduced.

19 Claims, 5 Drawing Sheets

(56) References Cited

U.S. PATENT DOCUMENTS

2017/0367036 A1   12/2017   Chen et al.
2018/0270744 A1*   9/2018   Griot ................. H04W 88/18
2021/0105702 A1*   4/2021   Jiang ................. H04W 72/04

FOREIGN PATENT DOCUMENTS

| CN | 106851589 A | 6/2017 | |
|---|---|---|---|
| CN | 107295609 A | 10/2017 | |
| CN | 107343306 A | 11/2017 | |
| CN | 107580360 A | 1/2018 | |
| WO | 2015178035 A1 | 11/2015 | |
| WO | 2017032280 A1 | 3/2017 | |
| WO | WO-2018064479 A1 * | 4/2018 | ............ H04W 36/12 |

OTHER PUBLICATIONS

ZTE, "Consideration on RAN Side Network Slicing", 3GPP TSG RAN WG3 Meeting#91bis, R3-160821, Bangalore, India, Apr. 11-15, 2016, total 9 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/075638, filed on Feb. 7, 2018, the disclosure of which is hereby incorporated by reference in its entirety.

TECHNICAL FIELD

The present disclosure relates to the communications field, and more specifically, to a communication method and a communications apparatus.

BACKGROUND

With the continuous emergence of various communications services, different communications services have significantly different requirements for network performance. A concept of a network slice (NS) is proposed in the industry, to cope with differences in the requirements of different communications services for network performance.

A network slice is a set of logical network function entities that support a specific requirement for a communications service, and the communications service can be customized by mainly using a software-defined networking (SDN) technology and a network functions virtualization (NFV) technology. One network slice meets a requirement for connecting the communications service for one or one type of use case, and an entire network system includes a large quantity of network slices that meet different connection capabilities.

In the prior art, a basic procedure for accessing a network slice by a terminal device includes: sending, by the terminal device, a request for the network slice to a network side; and determining, by a network management device on the network side, a target network slice that the terminal device should access, and indicating the terminal device to access the target network slice.

It can be learned from the foregoing description that in the prior art, the network side needs a centralized network management device to manage access of the terminal device to the network slice. In this way, network complexity is increased, and a latency in accessing the network slice by the terminal device is also increased.

SUMMARY

Various embodiments provide a communication method and a communications apparatus. A terminal device autonomously selects and accesses a target network slice, so that network complexity may be reduced, and a latency in accessing the target network slice by the terminal device may also be reduced.

According to a first aspect, a communication method is provided. The communication method may be performed by a terminal device. The communication method includes: receiving a first message from a shared channel of a plurality of network slices, where the first message includes a plurality of network identifiers (Identity, ID), and the plurality of network IDs are in a one-to-one correspondence with the plurality of network slices; selecting a target network slice from the plurality of network slices; and obtaining access configuration information of the target network slice from network configuration information, and accessing the target network slice based on the access configuration information of the target network slice, where the network configuration information includes a network ID of each of the plurality of network slices and the access configuration information of the target network slice.

In this embodiment, the terminal device may autonomously select and access the target network slice. Compared with the prior art, a network management device for selecting the target network slice for the terminal device may be omitted, so that network complexity may be reduced. In addition, the terminal device may access the target network slice by using locally-stored access configuration information, so that a latency in accessing a network by the terminal device may be effectively reduced.

With reference to the first aspect, in a possible implementation of the first aspect, each of the plurality of network IDs further corresponds to a service type; and the selecting a target network slice from the plurality of network slices includes:

selecting, as the target network slice, a network slice corresponding to a network ID that is in the plurality of network IDs and that corresponds to a service type of a current service.

In this embodiment, the network ID of the network slice corresponds to the service type, so that the terminal device may select, from the plurality of network IDs based on the service type of the current service, a network ID that has a correspondence with the current service type. To be specific, the terminal device may autonomously select a proper network slice from the plurality of network slices, so that the terminal device accesses the proper network slice.

With reference to the first aspect, in a possible implementation of the first aspect, the selecting a target network slice from the plurality of network slices includes: randomly selecting the target network slice from the plurality of network slices.

In this embodiment, the terminal device may autonomously select any network slice from the plurality of network slices as the target network slice to be accessed, so that flexibility of accessing a network by the terminal device may be improved.

With reference to the first aspect, in a possible implementation of the first aspect, the network configuration information is pre-configured, and the network configuration information further includes a mapping relationship between the network ID of each network slice and data transmission configuration information of each network slice, and the data transmission configuration information of each network slice includes resource pool information and transmission mode information that are used to perform data transmission with each network slice. The selecting, by the terminal device, a target network slice from the plurality of network slices includes: selecting, by the terminal device from the network configuration information, data transmission configuration information that matches a current service requirement, and selecting, as the target network slice, a network slice that corresponds to the network ID to which the selected data transmission configuration information is mapped.

In this embodiment, the mapping relationship between the network ID and the data transmission configuration information is pre-configured on the terminal device, so that the terminal device may select the target network slice from the plurality of network slices based on the current service requirement and the pre-configured data transmission configuration information. In other words, in this embodiment, the terminal device may autonomously select, based on the service type, the target network slice to be accessed, so that a network slice that can better meet the current service requirement may be selected. Therefore, in this embodiment, the terminal device can better complete a service, and flexibility of accessing a network by the terminal device may be improved.

With reference to the first aspect, in a possible implementation of the first aspect, the network configuration information is pre-configured, and the network configuration information further includes a mapping relationship between the network ID of each network slice and data transmission configuration information of each network slice; and after the accessing the target network slice, the method further includes: sending, by a network device, data transmission configuration information of the target network slice to the terminal device. Correspondingly, the terminal device updates, based on the data transmission configuration information received from a network side, the data transmission configuration information to which a network ID of the target network slice is mapped, where the data transmission configuration information is included in the network configuration information.

In this embodiment, after accessing the target network slice, the terminal device updates, by using the data transmission configuration information delivered by the network side, locally-configured data transmission configuration information to which the network ID of the target network slice is mapped. In this way, accuracy and validity of the local configuration information may be ensured, to help improve a success rate of data transmission between the terminal device and the target network slice.

With reference to the first aspect, in a possible implementation of the first aspect, the network configuration information includes a mapping relationship between the network ID of each network slice and access configuration information of each network slice, where the access configuration information of the target network slice is access configuration information that is included in the network configuration information and to which a network ID of the target network slice is mapped.

In this embodiment, different network slices in the plurality of network slices have different access configuration information, so that access processes of the different network slices are independent from each other.

With reference to the first aspect, in a possible implementation of the first aspect, the access configuration information included in the network configuration information is shared by the plurality of network slices, where the access configuration information of the target network slice is the access configuration information that is shared by the plurality of network slices and that is included in the network configuration information.

In this embodiment, the plurality of network slices share the access configuration information, so that network resources may be saved.

With reference to the first aspect, in a possible implementation of the first aspect, the first message further includes access configuration information corresponding to each of the plurality of network IDs, where the network configuration information is generated based on the first message.

In this embodiment, the terminal device may autonomously select, from the plurality of network slices, the target network slice to be accessed, and may obtain the access configuration information by receiving a message delivered by the network side, so that a network access process of the target network slice may be completed by using the access configuration information. In this way, a latency in accessing a network by the terminal device may be effectively reduced, and flexibility of accessing the network by the terminal device may also be improved.

With reference to the first aspect, in a possible implementation of the first aspect, the network configuration information is pre-configured.

In this embodiment, the terminal device may autonomously select, from the plurality of network slices, the target network slice to be accessed, and may complete a network access process of the target network slice based on the pre-configured access configuration information. In this way, a latency in accessing a network by the terminal device may be effectively reduced, and flexibility of accessing the network by the terminal device may also be improved.

With reference to the first aspect, in a possible implementation of the first aspect, after the accessing the target network slice, the method further includes: receiving a second message from a network side, where the second message carries data transmission configuration information, and the data transmission configuration information includes resource pool information and transmission mode information; and performing data transmission with the target network slice based on the data transmission configuration information.

According to a second aspect, a communication method is provided. The communication method may be performed by a network device. The communication method includes: generating a first message, where the first message includes a plurality of network identifiers IDs, and the plurality of network IDs are in a one-to-one correspondence with a plurality of network slices; and sending the first message to a first communications apparatus by using a shared channel of the plurality of network slices, where the first message is used to indicate the first communications apparatus to select, from the plurality of network slices, a target network slice to be accessed, and the first communications apparatus has network configuration information, and the network configuration information includes a network ID of each of the plurality of network slices and access configuration information of the target network slice.

In this embodiment, the network device delivers the plurality of network IDs, so that the terminal device may autonomously select, from the plurality of network slices, the target network slice to be accessed, and then the terminal device accesses the target network slice. Therefore, flexibility of accessing a network by the terminal device may be improved, and a latency in accessing the network by the terminal device may be effectively reduced.

With reference to the second aspect, in a possible implementation of the second aspect, each of the plurality of network IDs further corresponds to a service type; and the first message is further used to indicate the first communications apparatus to select, as the target network slice, a network slice corresponding to a network ID that is in the plurality of network IDs and that corresponds to a service type of a current service.

In this embodiment, the network ID of the network slice corresponds to the service type, so that the terminal device may select, from the plurality of network IDs based on the service type of the current service, a network ID that has a correspondence with the current service type. To be specific, the terminal device may autonomously select a proper network slice from the plurality of network slices, so that the terminal device accesses the proper network slice.

With reference to the second aspect, in a possible implementation of the second aspect, the network configuration information includes a mapping relationship between the network ID of each network slice and access configuration information of each network slice, where the access configuration information of the target network slice is access configuration information that is included in the network configuration information and to which a network ID of the target network slice is mapped.

In this embodiment, different network slices in the plurality of network slices have different access configuration information, so that access processes of the different network slices are independent from each other.

With reference to the second aspect, in a possible implementation of the second aspect, the first message further includes access configuration information corresponding to each of the plurality of network IDs, where the network configuration information is generated based on the first message.

In this embodiment, the network device delivers the plurality of network IDs and access configuration information corresponding to the plurality of network IDs, so that the terminal device may autonomously select, from the plurality of network slices, the target network slice to be accessed, and may complete a network access process of the target network slice by using the access configuration information delivered by a network side. In this way, a latency in accessing a network by the terminal device may be effectively reduced, and flexibility of accessing the network by the terminal device may also be improved.

With reference to the second aspect, in a possible implementation of the second aspect, after accessing, by the first communications apparatus, the target network slice, the method further includes: sending a second message to the first communications apparatus, where the second message carries data transmission configuration information, and the data transmission configuration information includes resource pool information and transmission mode information, and the second message is used to indicate the first communications apparatus to perform data transmission with the target network slice based on the data transmission configuration information.

With reference to the first aspect or the second aspect, in a possible implementation, the access configuration information includes at least one of the following information: random access configuration information, a power control parameter, paging resource time-frequency location information, and physical random access channel (PRACH) configuration information.

The random access configuration information includes at least one of the following information: information used to indicate a PRACH start carrier index, a start index and an end index of a common random access preamble (preamble), information used to indicate a start carrier index and a carrier quantity that are of a physical downlink control channel (PDCCH) carrying downlink control information (Downlink Control Information, DCI) corresponding to a random access response message, and configuration information of a plurality of PRACH resource groups, where each of the plurality of PRACH resource groups corresponds to one coverage level, and the configuration information of each PRACH resource group includes the carrier quantity and/or a time domain repetition quantity.

The power control parameter includes at least one of the following information: an uplink power control parameter and a downlink power control parameter.

The paging resource time-frequency location information includes at least one of the following information: a default paging cycle, a start carrier index of a paging control channel (PCCH), and a PCCH carrier quantity.

The PRACH configuration information includes at least one of the following information: a reference signal received power (RSRP) threshold, where the RSRP threshold is used to perform selection in PRACH resource groups corresponding to a plurality of coverage levels.

With reference to the first aspect or the second aspect, in a possible implementation, the data transmission configuration information includes information about a data transmission mode of an uplink channel, and the information about the data transmission mode of the uplink channel includes uplink scheduling information used to indicate a physical uplink shared channel (PUSCH) resource, or uplink non-scheduling information used to indicate that resource contention is performed in a pre-configured resource pool.

The uplink scheduling information includes PDCCH configuration information and PRACH configuration information, where the PDCCH configuration information includes at least one of the following information: a PDCCH start carrier index and a quantity of bound PDCCH carriers, and the PRACH configuration information includes at least one of the following information: a PRACH start carrier index, a PRACH carrier quantity, and a start index and an end index of a preamble carrying a scheduling request (SR).

The uplink non-scheduling information includes physical uplink shared channel (PUSCH) configuration information and physical hybrid automatic repeat request indicator channel (PHICH) configuration information, and the PUSCH configuration information includes at least one of the following information: a PUSCH start carrier index, a quantity of bound PUSCH carriers, a modulation and coding scheme (MCS) index, a time domain repetition quantity, a time domain repetition period, a time domain offset within a period, duration, and a Slot-Aloha contention window, and the PHICH configuration information includes at least one of the following information: a PHICH start carrier index, an MCS index, and a feedback delay, where the feedback delay indicates a time interval between a PHICH feedback moment and a PUSCH sending moment.

With reference to the first aspect or the second aspect, in a possible implementation, the data transmission configuration information includes information about a data transmission mode of a downlink channel, and the information about the data transmission mode of the downlink channel includes downlink scheduling information used to indicate a physical downlink shared channel (PDSCH) resource, or downlink non-scheduling information used to indicate that PDSCH blind detection is performed in a resource pool.

The downlink scheduling information includes PDCCH configuration information, and the PDCCH configuration information includes at least one of the following information: a PDCCH start carrier index, a quantity of bound PDCCH carriers, a time domain repetition period, and a time domain offset within a period.

The downlink non-scheduling information includes PDSCH configuration information and physical uplink control channel (Physical Uplink Control Channel, PUCCH) configuration information, and the PDSCH configuration information includes at least one of the following information: a PDSCH start carrier index, a quantity of bound PDSCH carriers, an MCS index, a time domain repetition quantity, a time domain repetition period, a time domain offset within a period, and duration, and the PUCCH configuration information includes at least one of the following information: a PUCCH start carrier index and a time domain repetition quantity.

With reference to the first aspect or the second aspect, in a possible implementation, all the plurality of network slices are public land mobile network PLMN networks.

According to a third aspect, a communications apparatus is provided. The communications apparatus is configured to perform the method according to any one of the first aspect or the possible implementations of the first aspect. Specifically, the communications apparatus may include a module configured to perform the method according to any one of the first aspect or the possible implementations of the first aspect.

According to a fourth aspect, a communications apparatus is provided. The communications apparatus is configured to perform the method according to any one of the second aspect or the possible implementations of the second aspect. Specifically, the communications apparatus may include a module configured to perform the method according to any one of the second aspect or the possible implementations of the second aspect.

According to a fifth aspect, a communications apparatus is provided. The communications apparatus includes a memory and a processor. The memory is configured to store an instruction, the processor is configured to execute the instruction stored in the memory, and the execution of the instruction stored in the memory enables the processor to perform the method according to any one of the first aspect or the possible implementations of the first aspect.

According to a sixth aspect, a communications apparatus is provided. The communications apparatus includes a memory and a processor. The memory is configured to store an instruction, the processor is configured to execute the instruction stored in the memory, and the execution of the instruction stored in the memory enables the processor to perform the method according to any one of the second aspect or the possible implementations of the second aspect.

According to a seventh aspect, a chip is provided. The chip includes a processing module and a communications interface. The processing module is configured to control the communications interface to communicate with an external device, and the processing module is further configured to implement the method according to any one of the first aspect or the possible implementations of the first aspect.

According to an eighth aspect, a chip is provided. The chip includes a processing module and a communications interface. The processing module is configured to control the communications interface to communicate with an external device, and the processing module is further configured to implement the method according to any one of the second aspect or the possible implementations of the second aspect.

According to a ninth aspect, a computer-readable storage medium is provided. The computer-readable storage medium stores a computer program. When the computer program is executed by a computer, the computer is enabled to implement the method according to any one of the first aspect or the possible implementations of the first aspect.

According to a tenth aspect, a computer-readable storage medium is provided. The computer-readable storage medium stores a computer program. When the computer program is executed by a computer, the computer is enabled to implement the method according to any one of the second aspect or the possible implementations of the second aspect.

According to an eleventh aspect, a computer program product including an instruction is provided. When the instruction is executed by a computer, the computer is enabled to implement the method according to any one of the first aspect or the possible implementations of the first aspect.

According to a twelfth aspect, a computer program product including an instruction is provided. When the instruction is executed by a computer, the computer is enabled to implement the method according to any one of the second aspect or the possible implementations of the second aspect.

DESCRIPTION OF EMBODIMENTS

The following describes technical solutions of this application with reference to accompanying drawings.

A network slice is a set of logical network function entities that support a specific requirement for a communications service, and mainly uses an SDN technology and an NFV technology. The NFV technology may implement mapping from an underlying physical resource to a virtualized resource, construct a virtual machine, and load a network function (NF). The SDN technology may implement logical connection between virtual machines, and construct a path for carrying signaling and a data flow. The network slice finally implements dynamic connection between a radio access network (RAN) and a network function entity of a core network (CN), configures an end-to-end service link, and implements flexible networking, so that a network may be customized. An operator may determine a network slice based on a requirement of each specific communications service for a key performance indicator (KPI) such as a capacity, coverage, a rate, a latency, and reliability. The network slice includes a set of network function entities and a network resource required for running the network function entities. In this way, telecom services and network capability services required by a user are provided for the user, to meet specific market scenarios and requirements.

Figure 1:
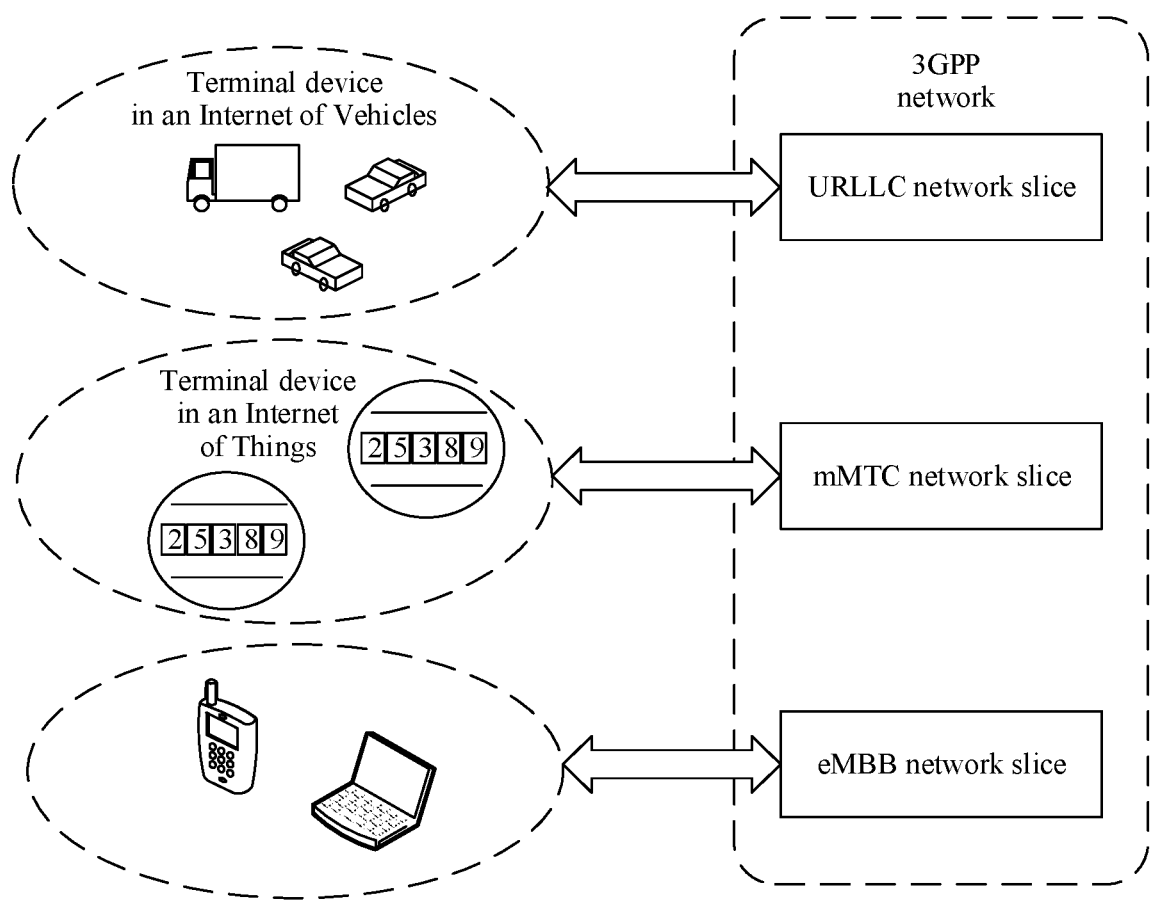
FIG. 1 is a schematic diagram of a network architecture including a plurality of network slices.

FIG. 1 is a schematic diagram of a network framework showing that a plurality of network slices are supported in the third generation partnership project (3GPP). In the 3GPP, the network slices are mainly classified into the following three types: an enhanced mobile broadband (eMBB) network slice, a massive machine-type communication (mMTC) network slice, and an ultra-reliable low-latency communication (URLLC) network slice. The eMBB network slice is mainly oriented to a terminal device having a relatively high requirement for a rate and mobility, for example, a mobile phone or a multimedia device. The mMTC network slice is mainly oriented to a terminal device in an Internet of Things, and the terminal device has a requirement for a large scale, low mobility, and a relatively low rate. The URLLC network slice is mainly oriented to a terminal device in an Internet of Vehicles, and the terminal device has a relatively high requirement for a latency and reliability. For example, a mobile phone may access the eMBB network slice to perform high-speed downloading or watch a 4K high-definition video. A sensor device may access the mMTC network slice to transmit a small packet and update a system configuration.

In the prior art, a network side needs a centralized network management device to manage access of the terminal device to the network slice. In this way, network complexity is increased, and a latency in accessing the network slice by the terminal device is also increased.

To overcome disadvantages in the prior art, this application provides a communication method and a communications apparatus, to reduce network complexity and reduce a latency in accessing the network slice by the terminal device.

A network device is used in the embodiments of this application. The network device may be a radio access network (RAN) device or a core network (CN) device. The network device may further be an access point, or a device that is in an access network and that communicates with a wireless terminal device on an air interface by using one or more sectors. For example, the network device is a network device (BTS) in a global system for mobile communications (GSM) or code division multiple access (CDMA), a network device (NodeB) in wideband code division multiple access (W-CDMA), or an evolved network device (eNB or e-NodeB) in long term evolution (Long Term Evolution, LTE). The network device may further be a radio controller in a cloud radio access network (CRAN) scenario. Alternatively, the network device may be a relay station, an access point, a network device in a fifth generation (5G) network, a network device in a public land mobile communications network (PLMN), or the like. This is not limited in the embodiments of this application.

A terminal device is further used in the embodiments of this application. The terminal device may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the 5G network, or a terminal device in the PLMN. Classified based on service types, the terminal device in the embodiments of this application may be the foregoing terminal device having the relatively high requirement for the rate and mobility, for example, the mobile phone or the multimedia device, may be the terminal device in the Internet of Things, or may be the terminal device in the Internet of Vehicles.

Figure 2:
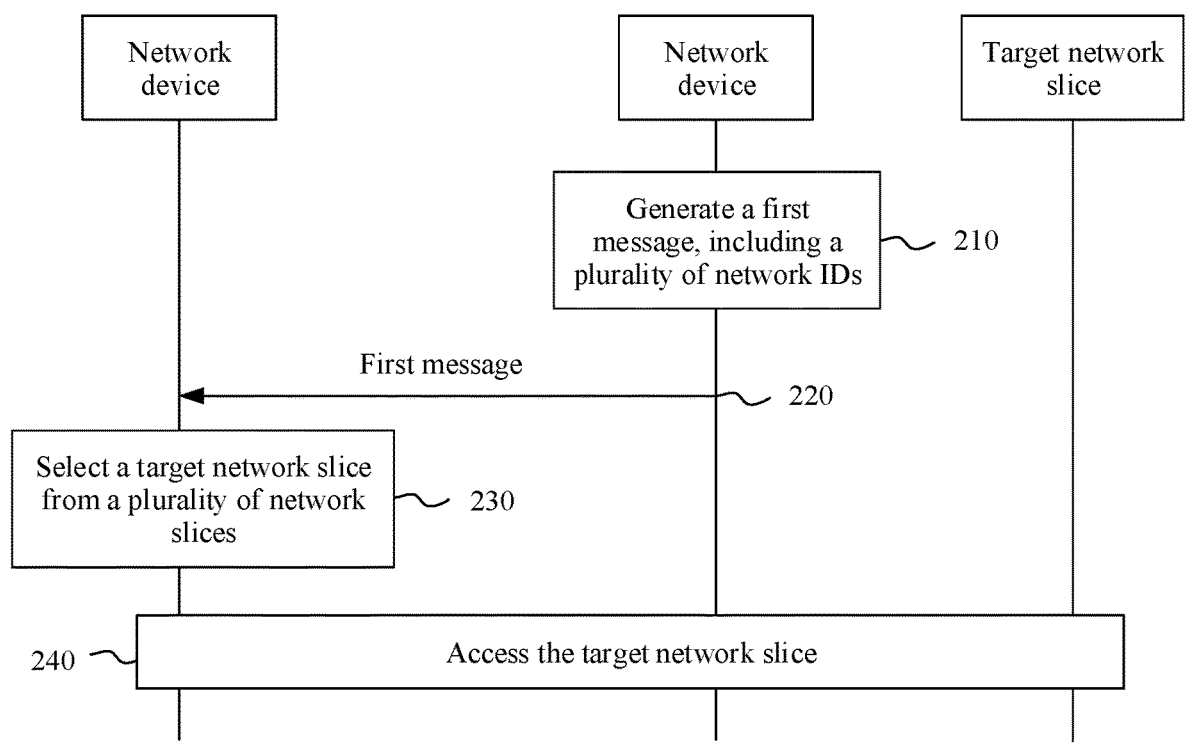
FIG. 2 is a schematic flowchart of a communication method according to an embodiment of this application.

FIG. 2 is a schematic flowchart of a communication method 200 according to an embodiment of this application. As shown in FIG. 2, the communication method 200 includes the following steps.

210: A network device generates a first message, where the first message includes a plurality of network identities (ID), and the plurality of network IDs are in a one-to-one correspondence with a plurality of network slices.

Specifically, in an example, the first message carries a list of network IDs, the list of network IDs includes the plurality of network IDs, and the plurality of network IDs are in a one-to-one correspondence with the plurality of network slices.

220: The network device sends the first message to a terminal device by using a shared channel of the plurality of network slices, where the first message is used to indicate the terminal device to select, from the plurality of network slices, a target network slice to be accessed.

Correspondingly, the terminal device receives the first message from the shared channel of the plurality of network slices.

It should be understood that after receiving the first message, the terminal device may discover a surrounding network slice based on a network ID that is of each network slice and that is carried in the first message.

In some embodiments, the first message is an air interface synchronization signal delivered by the network device by using a shared synchronization channel of the plurality of network slices.

In some embodiments, the first message is a system message or a physical broadcast channel (Physical Broadcast Channel, PBCH) broadcast message that is delivered by the network device by using a shared broadcast channel of the plurality of network slices.

230: The terminal device selects the target network slice from the plurality of network slices.

240: The terminal device obtains access configuration information of the target network slice from network configuration information, and accesses the target network slice based on the access configuration information of the target network slice, where the network configuration information includes a network ID of each of the plurality of network slices and the access configuration information of the target network slice.

The access configuration information herein is information about a time-frequency resource required by the terminal device to access a network. For example, the access configuration information is used to define information such as the time-frequency resource and an access criterion that are required when the terminal device needs to access the network.

The following describes information that may be included in the access configuration information in detail.

It should be understood that the network configuration information is locally stored in the terminal device.

In this embodiment, the terminal device may autonomously select and access the target network slice. Compared with the prior art, a network management device for selecting the target network slice for the terminal device may be omitted, so that network complexity may be reduced. In addition, the terminal device may access the target network slice by using locally-stored access configuration information, so that a latency in accessing the network by the terminal device may be effectively reduced.

For example, in 230, the terminal device may select the target network slice from the plurality of network slices based on a service type of a current service, or may directly select one network slice from the plurality of network slices as the target network slice.

In some embodiments, in some embodiments, each of the plurality of network IDs further corresponds to a service type. In 230, the terminal device selects, as the target network slice, a network slice corresponding to a network ID that is in the plurality of network IDs and that corresponds to the service type of the current service.

For example, the first message delivered by the network device includes the plurality of network IDs, each of the plurality of network IDs corresponds to one transmission mode, transmission modes corresponding to different network IDs are different, and different transmission modes correspond to different service types. The transmission modes include but are limited to information such as the time-frequency resource or a resource scheduling manner. For example, each network ID corresponds to one service type, and service types corresponding to different network IDs are different from each other. Specifically, in 230, the terminal device selects, from the plurality of network IDs based on the service type of the current service, a network ID corresponding to the service type of the current service, and uses a network slice corresponding to the selected network ID as the target network slice.

In this embodiment, the network ID of the network slice corresponds to the service type, so that the terminal device may select, from the plurality of network IDs based on the service type of the current service, a network ID that has a correspondence with the current service type. For example, the terminal device may autonomously select a proper network slice from the plurality of network slices, so that the terminal device accesses the proper network slice.

In some embodiments, in some embodiments, in 230, the terminal device randomly selects a network slice from the plurality of network slices as the target network slice.

In some embodiments, in some embodiments, the network configuration information is pre-configured, and the network configuration information further includes a mapping relationship between the network ID of each network slice and data transmission configuration information of each network slice, and the data transmission configuration information of each network slice includes resource pool information and transmission mode information that are used for data transmission with each network slice. In 220, that the terminal device selects the target network slice from the plurality of network slices includes: selecting, by the terminal device from the network configuration information, data transmission configuration information that matches a current service requirement, and selecting, as the target network slice, a network slice that corresponds to the network ID and to which the selected data transmission configuration information is mapped.

The data transmission configuration information mentioned in this specification is used to define information such as configuration of a time-frequency resource pool for uplink data transmission and/or downlink data transmission.

For example, the data transmission configuration information of a network slice 1 is used as an example. The data transmission configuration information is time domain resource information and transmission mode information that are required by the terminal device and the network slice 1 to perform data transmission after the terminal device accesses the network slice 1, and the transmission mode information includes resource scheduling information.

The following describes information that may be included in the data transmission configuration information in detail.

In this embodiment, a mapping relationship between the network ID and the data transmission configuration information is pre-configured on the terminal device, so that the terminal device may select the target network slice from the plurality of network slices based on the current service requirement and the pre-configured data transmission configuration information. In other words, in this embodiment, the terminal device may autonomously select, based on the service type, the target network slice to be accessed, so that a network slice that can better meet the current service requirement may be selected. Therefore, in this embodiment, the terminal device can better complete a service, and flexibility of accessing a network by the terminal device may be improved.

In some embodiments, as in this embodiment, after the accessing the target network slice, the method 200 further includes: sending, by the network device, data transmission configuration information of the target network slice to the terminal device.

Correspondingly, the terminal device updates, based on the data transmission configuration information received from the network side, the data transmission configuration information that is included in the network configuration information and to which a network ID of the target network slice is mapped.

For example, the network device delivers the data transmission configuration information of the target network slice to the terminal device by using a radio resource control (RRC) message.

In this embodiment, after accessing the target network slice, the terminal device updates, by using the data transmission configuration information delivered by the network side, locally-configured data transmission configuration information to which the network ID of the target network slice is mapped. In this way, accuracy and validity of the local configuration information may be ensured, to help improve a success rate of data transmission between the terminal device and the target network slice.

For example, the network configuration information includes a mapping relationship between the network ID of each network slice and access configuration information of the network slice, and access configuration information to which different network IDs are mapped are different. Alternatively, the access configuration information included in the network configuration information is shared by the plurality of network IDs (namely, the plurality of network slices).

In some embodiments, the network configuration information includes a mapping relationship between the network ID of each of the plurality of network slices and access configuration information of each network slice. The access configuration information of the target network slice is access configuration information that is included in the network configuration information and to which a network ID of the target network slice is mapped.

For example, the network configuration information on the terminal device includes the plurality of network IDs, and further includes access configuration information that has a mapping relationship with each network ID. For example, the network configuration information includes N network IDs and N groups of access configuration information, and the N network IDs are one-to-one mapped to the N groups of access configuration information. For example, in 240, the terminal device obtains, from the network configuration information, the network ID of the target network slice selected in 230, and accesses the target network slice based on the access configuration information to which the network ID of the target network slice is mapped.

For example, for the network slice 1, the terminal device needs to access the network slice 1 based on access configuration information to which the network ID of the network slice 1 is mapped. For a network slice 2, the terminal device needs to access the network slice 2 based on access configuration information to which the network ID of the network slice 2 is mapped.

In this embodiment, different network slices in the plurality of network slices have different access configuration information, so that access processes of the different network slices are independent from each other.

In some embodiments, the access configuration information included in the network configuration information is shared by the plurality of network slices. The access configuration information of the target network slice is access configuration information that is shared by the plurality of network slices and that is included in the network configuration information.

For example, the network configuration information includes the access configuration information and the plurality of network IDs, the plurality of network IDs are in a one-to-one correspondence with the plurality of network slices, and the plurality of network slices share the access configuration information. Alternatively, the network configuration information includes a mapping relationship between each of the plurality of network IDs and the access configuration information, the plurality of network IDs are in a one-to-one correspondence with the plurality of network slices, and the access configuration information to which all the IDs are mapped is the same.

Regardless of which network slice in the plurality of network slices is selected by the terminal device as the target network slice, the terminal device performs an access process based on the access configuration information included in the network configuration information.

In this embodiment, the plurality of network slices share the access configuration information, so that network resources may be saved.

For example, the network configuration information on the terminal device may be generated based on the first message delivered by the network side, or may be pre-configured.

In some embodiments, the first message further includes access configuration information corresponding to each of the plurality of network IDs. The network configuration information is generated based on the first message.

For example, in 210, the network device generates the first message, where the first message includes the plurality of network IDs, the plurality of network IDs are in a one-to-one correspondence with the plurality of network slices, and the first message further includes the access configuration information corresponding to each of the plurality of network IDs. In 220, the network device sends the first message to the terminal device by using a shared channel of the plurality of network slices, and the terminal device receives the first message. The method further includes: parsing, by the terminal device, the plurality of network IDs and the access configuration information corresponding to each network ID that are in the first message, and generating the network configuration information based on the information. The network configuration information includes the network ID of each of the plurality of network slices, and further includes the access configuration information of each network slice.

In this embodiment, access configuration information that corresponds to different network IDs and that is carried in the first message is different from each other. Correspondingly, the network configuration information generated by the terminal device based on the first message includes a mapping relationship between the network ID of each network slice and the access configuration information of each network slice, and access configuration information to which different IDs are mapped is different from each other.

In this embodiment, the access configuration information that corresponds to different network IDs and that is carried in the first message is the same. Correspondingly, the network configuration information generated by the terminal device based on the first message includes the mapping relationship between the network ID of each network slice and the access configuration information of each network slice, and the access configuration information to which different IDs are mapped is the same. Alternatively, the network configuration information does not include the mapping relationship between the network ID and the access configuration information, but directly includes a group of access configuration information and network IDs of the plurality of network slices. The plurality of network slices share the group of access configuration information.

In this embodiment, the terminal device may autonomously select, from the plurality of network slices, the target network slice to be accessed, and may obtain the access configuration information by receiving a message delivered by the network side, so that a network access process of the target network slice may be completed by using the access configuration information. In this way, a latency in accessing the network by the terminal device may be effectively reduced, and flexibility of accessing the network by the terminal device may also be improved.

In some embodiments, the network configuration information is pre-configured on the terminal device. To be specific, the access configuration information is also pre-configured on the terminal device.

For example, the network configuration information is manually pre-configured on the terminal device. For another example, the network configuration information is pre-configured on the terminal device by using a protocol.

In this embodiment, the terminal device may autonomously select, from the plurality of network slices, the target network slice to be accessed, and may complete a network access process of the target network slice based on the pre-configured access configuration information. In this way, a latency in accessing the network by the terminal device may be effectively reduced, and flexibility of accessing the network by the terminal device may also be improved.

In this embodiment, the first message further includes access configuration information corresponding to at least one of the plurality of network IDs. The method further includes: updating, by the terminal device based on the first message, the access configuration information that corresponds to the at least one network ID and that is in the network configuration information.

In this embodiment, the terminal device updates the access configuration information in the locally pre-configured network configuration information by using the information delivered by the network side. In this way, validity of the locally-stored access configuration information may be ensured, to help improve a success rate of accessing the network by the terminal device.

After completing the access process of the target network slice, the terminal device can send data to the target network slice only after obtaining an uplink transmission resource. In this application, the terminal device may perform data transmission with the target network slice based on the data transmission configuration information delivered by the network side, or may perform data transmission based on the pre-configured data transmission configuration information.

In some embodiments, the network configuration information is pre-configured, and the network configuration information further includes the mapping relationship between the network ID of each network slice and the data transmission configuration information of each network slice. After the terminal device accesses the target network slice, the communication method further includes: sending, by the terminal device, uplink data to the target network slice based on the data transmission configuration information (denoted as configuration information X for data transmission) that is included in the network configuration information and to which the network ID of the target network slice is mapped.

For example, the terminal device sends uplink data to the target network slice based on a transmission mode indicated by the data transmission configuration information X by using a time-frequency resource indicated by the data transmission configuration information X.

It should be understood that the terminal device may send the uplink data to the target network slice by using the pre-configured data transmission configuration information X in the following case: The terminal device accesses the target network slice, and needs to send the uplink data, but does not receive the resource scheduling information that is delivered by the target network slice and that is used to send the uplink data.

In this embodiment, after the terminal device accesses the target network slice, the method further includes: sending, by the network device, a second message to the terminal device, where the second message carries data transmission configuration information, and the data transmission configuration information includes resource pool information and transmission mode information. Correspondingly, the terminal device parses the second message, and updates, based on the data transmission configuration information carried in the second message, the data transmission configuration information to which the network ID of the target network slice is mapped, and the data transmission configuration information is included in the network configuration information.

In this embodiment, the mapping relationship between the network ID and the data transmission configuration information is pre-configured on the terminal device. Therefore, after accessing a network, the terminal device may send the uplink data to the target network slice by using the pre-configured data transmission configuration information. In this way, a latency in sending the uplink data by the terminal device may be reduced.

In some embodiments, after the accessing, by the terminal device, the target network slice, the method further includes:

sending, by the network device, a second message to the terminal device, where the second message carries data transmission configuration information, the data transmission configuration information includes resource pool information and transmission mode information, and the second message is used to indicate the terminal device to perform data transmission with the target network slice based on the data transmission configuration information.

Correspondingly, the terminal device parses the second message, and performs data transmission with the target network slice based on the data transmission configuration information carried in the second message.

For example, the second message is an RRC message.

In conclusion, in the technical solutions provided in this application, the terminal device may autonomously select the target network slice from the plurality of network slices, complete a network access process based on the pre-configured access configuration information or access configuration information delivered by the network, and transmit service data based on the pre-configured data transmission configuration information or the data transmission configuration information delivered by the network. Therefore, compared with the prior art, in the technical solutions provided in this application, a network management device for selecting the target network slice for the terminal device may be omitted, so that network complexity may be reduced. In addition, the terminal device may access the target network slice by using locally-stored access configuration information, so that a latency in accessing the network by the terminal device may be effectively reduced.

The following describes the access configuration information and the data transmission configuration information in the embodiments of this application.

In some embodiments, the access configuration information mentioned in some of the foregoing embodiments includes at least one of the following information:

1) Random Access Configuration Information.

The random access configuration information includes at least one of the following information:

(1) Information used to indicate a physical random access channel (physical random access channel, PRACH) start carrier index In some embodiments, in a scenario in which the random access channel includes a plurality of coverage levels, the information includes explicit indication information and implicit indication information, where the explicit indication information is used to explicitly indicate a start carrier index and a carrier quantity of a PRACH that are at a first coverage level, and the implicit indication information is used to implicitly indicate a start carrier index of a PRACH at another coverage level after the first coverage level.

In some embodiments, the random access channel includes the plurality of coverage levels, and a PRACH at each coverage level has a specific start carrier index and carrier quantity. For example, the plurality of coverage levels are a coverage level 0, a coverage level 1, . . . , and a coverage level m, and the information used to indicate a start carrier index of a PRACH includes the following content: a start carrier index of a PRACH at the coverage level 0, a carrier quantity of the PRACH at the coverage level 0, a carrier quantity of a PRACH at the coverage level 0, . . . , and a carrier quantity of a PRACH at the coverage level m−1.

A receive end of the information may obtain the start carrier index of the PRACH at the coverage level 0 based on the start carrier index of the PRACH at the coverage level 0 that is included in the information. To be specific, this part of content is explicit indication information used to indicate the start carrier index of the PRACH at the coverage level 0.

The receive end of the information may obtain a start carrier index of a PRACH at the coverage level 1 (the start carrier index of the PRACH at the coverage level 0 plus the carrier quantity of the PRACH at the coverage level 0) based on the start carrier index of the PRACH at the coverage level 0 and the carrier quantity of the PRACH at the coverage level 0 that are included in the information, then obtain a start carrier index of a PRACH at a coverage level 2 (the start carrier index of the PRACH at the coverage level 1 plus a carrier quantity of the PRACH at the coverage level 1) based on the start carrier index of the PRACH at the coverage level 1 and the carrier quantity of the PRACH at the coverage level 1, and by analogy, finally obtain a start carrier index of a PRACH at each of m+1 coverage levels. It should be understood that the foregoing start carrier index of the PRACH at the coverage level 0, the carrier quantity of the PRACH at the coverage level 0, the carrier quantity of the PRACH at the coverage level 0, . . . , and the carrier quantity of the PRACH at the coverage level m−1 are implicit indication information used to implicitly indicate start carrier indexes of PRACHs at the coverage level 1 to the coverage level m.

In some embodiments, the information used to indicate a PRACH start carrier index explicitly indicates the PRACH start carrier index.

For example, the information directly indicates the PRACH start carrier index. For example, in a scenario in which the random access channel includes a plurality of coverage levels, the information is used to directly indicate a start carrier index of a PRACH at each coverage level.

(2) Start and end indexes of a common random access preamble (preamble)

(3) Information used to indicate a start carrier index and a carrier quantity that are of a physical downlink control channel (Physical Downlink Control Channel, PDCCH) carrying downlink control information (Downlink Control Information, DCI) corresponding to a random access response message Optionally, in a scenario in which the random access channel includes a plurality of coverage levels, the information used to indicate the start carrier index and the carrier quantity that are of the PDCCH carrying the DCI corresponding to the random access response message includes explicit indication information and implicit indication information, where the explicit indication information is used to explicitly indicate a start carrier index and a carrier quantity of a PDCCH at the first coverage level, and the implicit indication information is used to implicitly indicate a start carrier index of a PDCCH at another coverage level after the first coverage level.

For example, the random access channel includes the plurality of coverage levels, and a PDCCH at each coverage level has a specific start carrier index and carrier quantity. For example, the plurality of coverage levels are a coverage level 0, a coverage level 1, . . . , and a coverage level m, and the information used to indicate a start carrier index of a PDCCH includes the following content: a start carrier index of a PDCCH at the coverage level 0, a carrier quantity of the PDCCH at the coverage level 0, a carrier quantity of a PDCCH at the coverage level 0, . . . , and a carrier quantity of a PDCCH at the coverage level m−1.

A receive end of the information may obtain the start carrier index of the PDCCH at the coverage level 0 based on the start carrier index of the PDCCH at the coverage level 0 that is included in the information. To be specific, this part of content is explicit indication information used to indicate the start carrier index of the PDCCH at the coverage level 0.

The receive end of the information may obtain a start carrier index of a PDCCH at the coverage level 1 (the start carrier index of the PDCCH at the coverage level 0 plus the carrier quantity of the PDCCH at the coverage level 0) based on the start carrier index of the PDCCH at the coverage level 0 and the carrier quantity of the PDCCH at the coverage level 0 that are included in the information, then obtain a start carrier index of a PDCCH at a coverage level 2 (the start carrier index of the PDCCH at the coverage level 1 plus a carrier quantity of the PDCCH at the coverage level 1) based on the start carrier index of the PDCCH at the coverage level 1 and the carrier quantity of the PDCCH at the coverage level 1, and by analogy, finally obtain a start carrier index of a PDCCH at each of m+1 coverage levels. It should be understood that the foregoing start carrier index of the PDCCH at the coverage level 0, the carrier quantity of the PDCCH at the coverage level 0, the carrier quantity of the PDCCH at the coverage level 0, . . . , and the carrier quantity of the PDCCH at the coverage level m−1 are implicit indication information used to implicitly indicate start carrier indexes of PDCCHs at the coverage level 1 to the coverage level m.

In some embodiments, the information used to indicate the start carrier index and the carrier quantity that are of the PDCCH carrying the DCI corresponding to the random access response message explicitly indicates the start carrier index and the carrier quantity of the PDCCH.

For example, the information directly indicates the start carrier index and the carrier quantity of the PDCCH. For example, in a scenario in which the random access channel includes a plurality of coverage levels, the information is used to directly indicate a start carrier index and a carrier quantity of a PDCCH at each coverage level.

(4) Configuration information of a plurality of PRACH resource groups, where each of the plurality of PRACH resource groups corresponds to one coverage level, and the configuration information of each PRACH resource group includes a carrier quantity and/or a time domain repetition quantity For example, one network slice may correspond to the plurality of coverage levels, and each coverage level corresponds to one PRACH resource group.

2) Power Control Parameter

The power control parameter includes at least one of the following information: an uplink power control parameter and a downlink power control parameter.

3) Paging Resource Time-Frequency Location Information

The paging resource time-frequency location information includes at least one of the following information: a default paging cycle, a paging control channel (Paging Control Channel, PCCH) start carrier index, and a PCCH carrier quantity.

4) PRACH Configuration Information

The PRACH configuration information includes at least one of the following information: a reference signal received power (Reference Signal Receiving Power, RSRP) threshold.

For example, the RSRP threshold is used to select a coverage level. To be specific, the RSRP threshold is used to perform selection in PRACH resource groups corresponding to the plurality of coverage levels.

In some embodiments, the data transmission configuration information mentioned in some of the foregoing embodiments includes information about a data transmission mode of an uplink channel, and the information about the data transmission mode of the uplink channel includes any one of the following information.

1) Uplink Scheduling Information Used to Indicate a Physical Uplink Shared Channel (PUSCH) Resource The uplink scheduling information includes PDCCH configuration information and PRACH configuration information. The PDCCH configuration information includes at least one of the following information: a PDCCH start carrier index and a quantity of bound PDCCH carriers. The PRACH configuration information includes at least one of the following information: a PRACH start carrier index, a PRACH carrier quantity, and a start index and an end index that are of a preamble carrying a scheduling request (SR).

(2) Uplink non-scheduling information used to indicate that resource contention is performed in a pre-configured resource pool The uplink non-scheduling information includes physical uplink shared channel (PUSCH) configuration information and physical hybrid automatic repeat request indicator channel (PHICH) configuration information. The PUSCH configuration information includes at least one of the following information: a PUSCH start carrier index, a quantity of bound PUSCH carriers, a modulation and coding scheme (MCS) index, a time domain repetition quantity, a time domain repetition period, a time domain offset within a period, duration, and a Slot-Aloha contention window, and the PHICH configuration information includes at least one of the following information: a PHICH start carrier index, an MCS index, and a feedback latency, where the feedback latency indicates a time interval between a PHICH feedback moment and a PUSCH sending moment.

In some embodiments, the data transmission configuration information mentioned in some of the foregoing embodiments includes information about a data transmission mode of an uplink channel, and the information about the data transmission mode of the uplink channel includes any one of the following information.

1) Downlink Scheduling Information Used to Indicate a Physical Downlink Shared Channel (PDSCH) Resource The downlink scheduling information includes PDCCH configuration information, and the PDCCH configuration information includes at least one of the following information: a PDCCH start carrier index, a quantity of bound PDCCH carriers, a time domain repetition period, and a time domain offset within a period.

2) Downlink Non-Scheduling Information Used to Indicate that PDSCH Blind Detection is Performed in a Resource Pool The downlink non-scheduling information includes PDSCH configuration information and physical uplink control channel (PUCCH) configuration information, and the PDSCH configuration information includes at least one of the following information: a PDSCH start carrier index, a quantity of bound PDSCH carriers, an MCS index, a time domain repetition quantity, a time domain repetition period, a time domain offset within a period, and duration, and the PUCCH configuration information includes at least one of the following information: a PUCCH start carrier index and a time domain repetition quantity.

Figure 3:
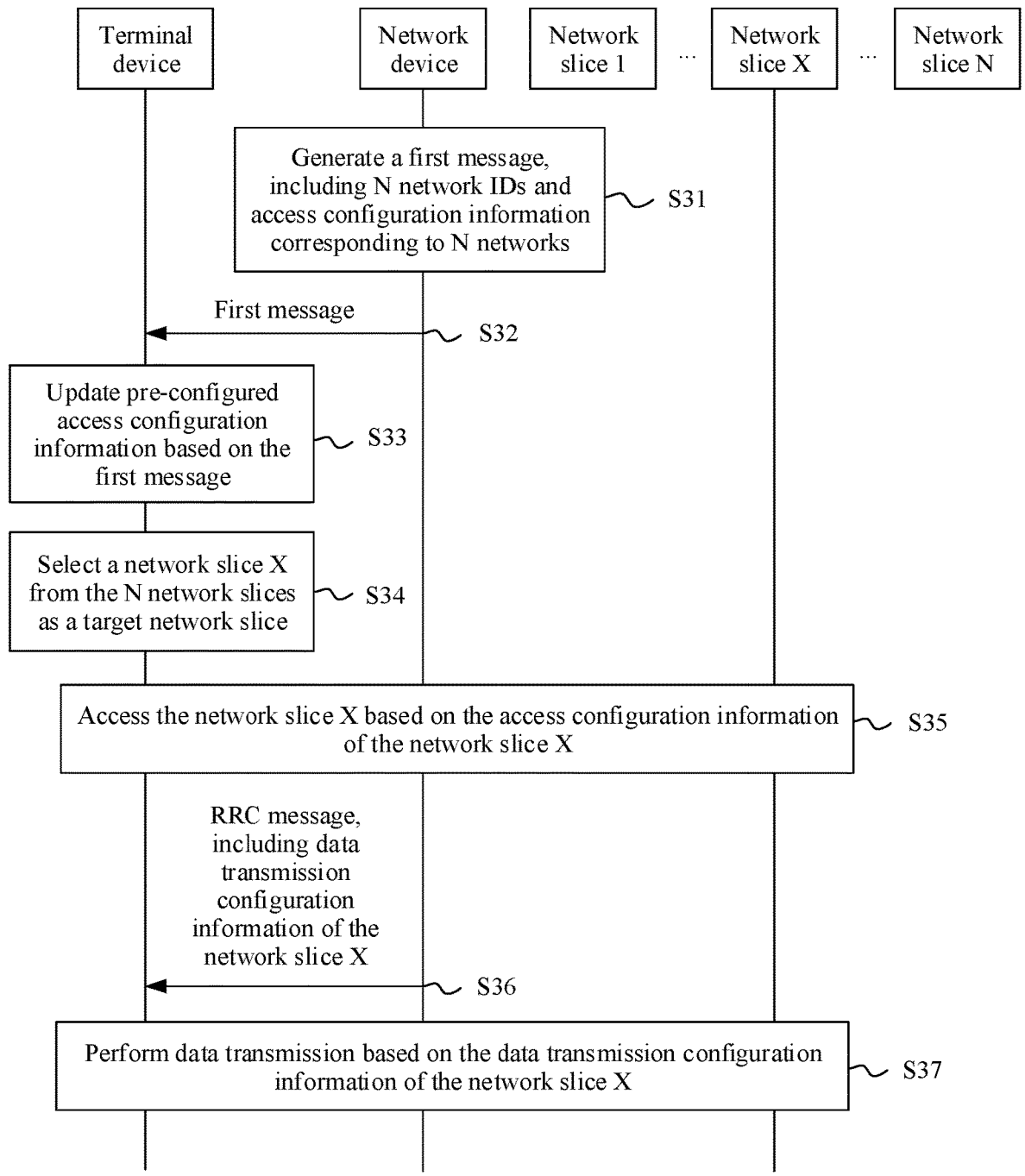
FIG. 3 is another schematic flowchart of a communication method according to an embodiment of this application.

To better understand the technical solutions provided in this application, the following describes a specific embodiment of this application with reference to FIG. 3.

As shown in FIG. 3, it is assumed that there are N network slices in a network. It is assumed that a terminal device in FIG. 3 has completed pre-configuration of network configuration information, and the network configuration information includes a mapping relationship between a network ID of each of the N network slices and access configuration information of each network slice. As shown in FIG. 3, the communication method includes the following processes.

S31: A network device generates a first message, where the first message includes N network IDs, and the N network IDs are respectively used to indicate the N network slices shown in FIG. 3. To be specific, the N network IDs are in a one-to-one correspondence with the N network slices shown in FIG. 3. The first message further includes access configuration information corresponding to a network ID of each network slice, and N is an integer greater than 1.

S32: The network device sends the first message to the terminal device by using a shared channel of the N network slices.

For example, the first message is an air interface signal sent by the network device to the terminal device by using a shared synchronization channel of the N network slices. Alternatively, the first message is a system message or a PBCH broadcast signal that is sent by the network device to the terminal device by using a shared broadcast channel of the N network slices.

S33: After receiving the first message, the terminal device parses the network ID in the first message, to discover a network slice 1 to a network slice N. In addition, the terminal device updates, based on the access configuration information that is of each network slice and that is carried in the first message, the access configuration information that is in the pre-configured network configuration information and to which each network ID is mapped.

S34: The terminal device selects a target network slice, for example, a network slice X in FIG. 3 from the N network slices.

For an example method of selecting the target network slice from the N network slices by the terminal device, refer to the foregoing description of step 230. Details are not described herein again.

S35: The terminal device sends an access request to the target network slice by using access configuration information of the target network slice (the network slice X is used as an example in FIG. 3), to complete an access process.

An example process of accessing the network by the terminal device is in the prior art, and details are not described herein.

S36: After the terminal device accesses the target network slice (the network slice X is used as an example in FIG. 3), the network device sends an RRC message to the terminal device, where the RRC message carries the data transmission configuration information of the target network slice. Correspondingly, the terminal device receives the RRC message.

S37: The terminal device parses the RRC message, and performs data transmission with the target network slice based on the data transmission configuration information carried in the RRC message.

It should be understood that the foregoing explanation about the access configuration information is also applicable to the access configuration information in this embodiment, and the foregoing explanation about the data transmission configuration information is also applicable to the data transmission configuration information in this embodiment. For brevity, details are not described herein again.

In the technical solutions provided in this embodiment, the terminal device may autonomously select and access the target network slice. Compared with the prior art, a network management device for selecting the target network slice for the terminal device may be omitted, so that network complexity may be reduced. In addition, the terminal device may access the target network slice by using locally-stored access configuration information, so that a latency in accessing the network by the terminal device may be effectively reduced.

The technical solutions provided in this application may be applied to a scenario in which there are a plurality of network slices. For example, the technical solutions provided in this application may be applied to a public land mobile network (PLMN).

In some of the foregoing embodiments, the plurality of network slices are a plurality of network slices in the PLMN.

Figure 4:
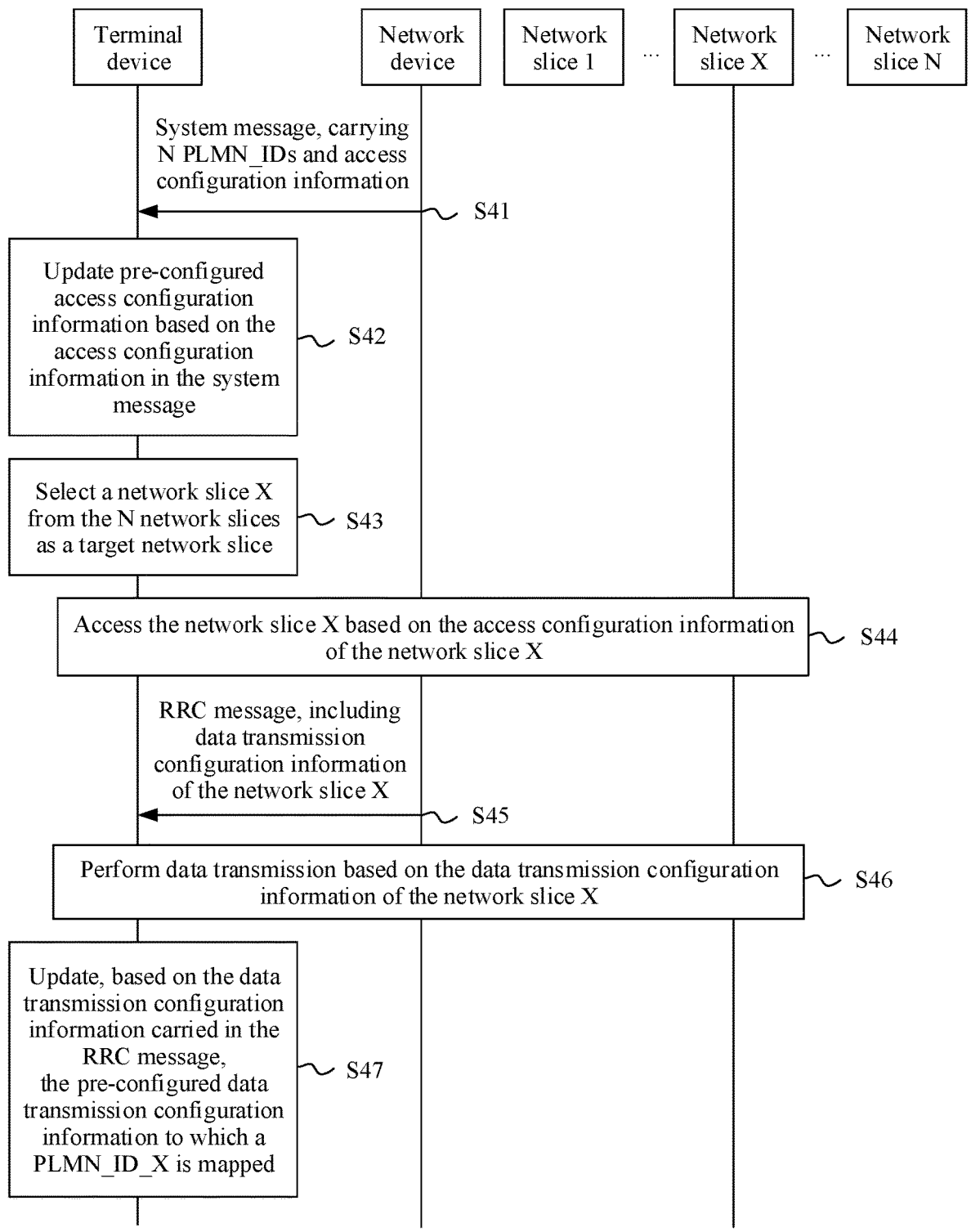
FIG. 4 is still another schematic flowchart of a communication method according to an embodiment of this application.

FIG. 4 is a schematic flowchart for applying an embodiment of this application to a PLMN scenario. As shown in FIG. 4, it is assumed that there are N network slices in a PLMN network. It is assumed that a terminal device in FIG. 4 has completed pre-configuration of network configuration information, and the network configuration information includes a mapping relationship between a PLMN_ID of each of the N network slices and access configuration information of each network slice, and further includes a mapping relationship between the PLMN_ID of each network slice and data transmission configuration information of each network slice. Specifically, the network configuration information is shown in Table 1.

TABLE 1

| PLMN_ID | Access configuration information | Data transmission configuration information |
|---|---|---|
| PLMN_ID_1 | Access configuration information_1 | Data transmission configuration information_1 |
| PLMN_ID_2 | Access configuration information_2 | Data transmission configuration information_2 |
| ... | ... | ... |
| PLMN_ID_X | Access configuration information_X | Data transmission configuration information_X |
| ... | ... | ... |
| PLMN_ID_N | Access configuration information_N | Data transmission configuration information_N |

The access configuration information is used to define a time-frequency resource required by the terminal device to access the PLMN. The data transmission configuration information is used to define information such as configuration of a time-frequency resource pool for uplink and downlink transmission.

As shown in Table 1, there is a mapping relationship among PLMN_ID_1, access configuration information_1, and data transmission configuration information_1, and there is a mapping relationship among PLMN_ID_X, access configuration information_X, and data transmission configuration information_X.

By using the network slice X as an example, in the network configuration information, the PLMN_ID_X of the network slice X is associated with the access configuration information_X of the network slice X and the data transmission configuration information_X.

It should be understood that Table 1 is merely an example but not a limitation.

As shown in FIG. 4, the communication method includes the following processes.

S41: A network device sends a system message to the terminal device on a shared broadcast channel of the N network slices, where the system message carries a list of network IDs, the list of network IDs includes a plurality of PLMN_IDs, and the plurality of PLMN_IDs are in a one-to-one correspondence with the N network slices. For example, PLMN_ID1 corresponds to a first network slice in a plurality of network slices. The system message further carries access configuration information corresponding to at least one PLMN_ID in the list of network IDs.

S42: The terminal device receives the system message, parses the list of network IDs in the system message, and updates, based on the access configuration information carried in the system message, access configuration information that is in pre-configured network configuration information and to which a corresponding PLMN_ID is mapped.

For example, the access configuration information that is included in the network configuration and to which the at least one PLMN_ID is mapped is updated based on the access configuration information that corresponds to the at least one PLMN_ID and that is carried in the system message.

S43: The terminal device selects a target network slice from the N network slices (a network slice X is used as an example in FIG. 4).

For a specific method of selecting the target network slice from the N network slices by the terminal device, refer to the foregoing description of step 230. Details are not described herein again.

S44: By using an example in which the target network slice is the network slice X in FIG. 4, the terminal device initiates access to the network slice X based on the network ID of the network slice X, namely, the access configuration information to which the PLMN_ID_X is mapped, to complete network access.

S45: The network device sends an RRC message to the terminal device, where the RRC message carries the data transmission configuration information of the network slice X. Correspondingly, the terminal device receives the RRC message.

S46: The terminal device parses the RRC message, and performs data transmission with the network slice X based on the data transmission configuration information carried in the RRC message.

S47. The terminal device updates, based on the data transmission configuration information carried in the RRC message, the data transmission configuration information to which the network ID (namely, PLMN_ID_X) of the network slice X is mapped, and the data transmission configuration information is in the locally-stored network configuration information.

In this embodiment, the terminal device may autonomously select the target network slice from a plurality of network slices in the PLMN network, complete a network access process based on pre-configured access configuration information or access configuration information carried in a broadcast channel, and perform service data transmission based on the pre-configured data transmission configuration information or data transmission configuration information carried in RRC signaling. Therefore, compared with the prior art, in this embodiment, a network management device for selecting the target network slice for the terminal device may be omitted, so that network complexity may be reduced. In addition, the terminal device may access the target network slice by using locally-stored access configuration information, so that a latency in accessing the network by the terminal device may be effectively reduced.

It should be understood that the technical solutions provided herein may further be applied to an Internet of Things (Internet of Things, IoT) dedicated network related to power control, and the IoT dedicated network provides services for different types of terminal devices by using different network slices. The technical solutions provided in this application may further be applied to a power communications dedicated network. In the power communications dedicated network, different types of terminal devices have different types of services. For example, a common collection terminal device needs to run in a different logical network from that of a power distribution terminal device or a precision control terminal device. To be specific, different types of terminal devices need to access different network slices. It should be further understood that the technical solutions provided in this application may further be applied to another network system including the plurality of network slices.

In some embodiments, the technical solutions provided in the embodiments of this application may be applied to a system that is of the plurality of network slices and in which a same terminal device accesses only one network slice.

The foregoing describes the communication method provided in the embodiments of this application, and the following describes the communications apparatus provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that to implement the foregoing functions, each network element, for example, a transmit end device or a receive end device, includes corresponding hardware structures and/or software modules for performing the functions. A person skilled in the art should easily be aware that in combination with units and algorithm steps of the examples described in the embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, functional modules of the transmit end device or the receive end device may be divided based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that in the embodiments of this application, module division is an example, and is merely a logical function division. In actual implementation, another division manner may be used. The following uses an example in which the functional modules are obtained through division based on corresponding functions.

An embodiment further provides a first communications apparatus. The first communications apparatus may be a terminal device or a chip. The first communications apparatus may be configured to perform actions performed by the terminal device in the foregoing method embodiments.

Figure 5:
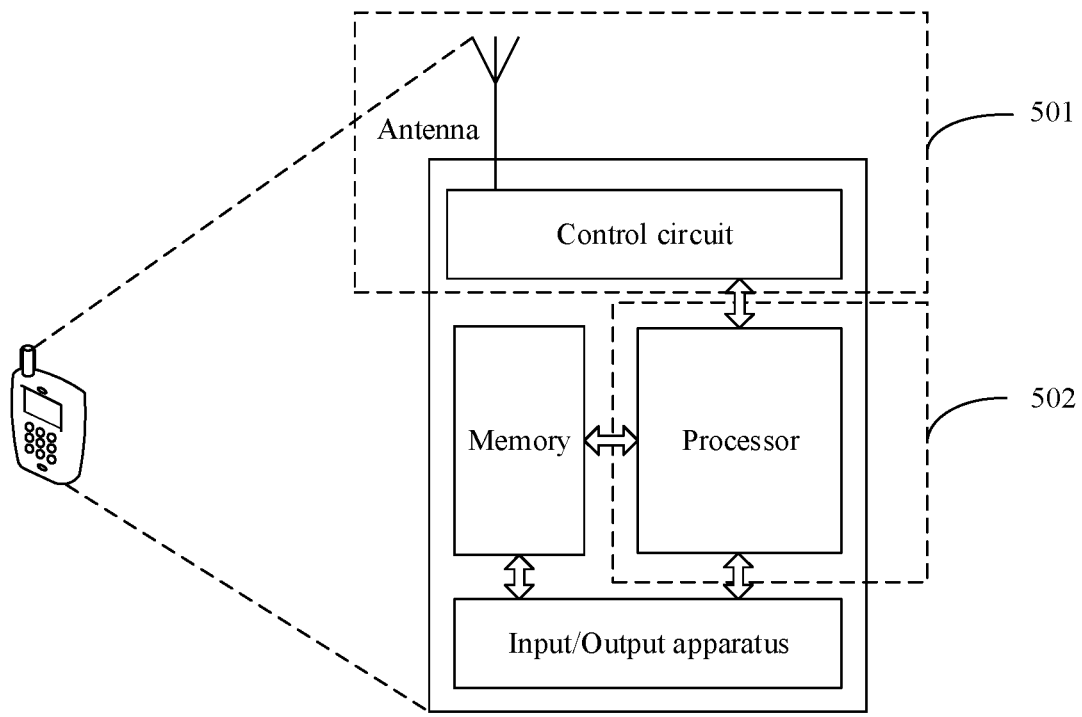
FIG. 5 is a schematic block diagram of a communications apparatus according to an embodiment of this application.

When the first communications apparatus is the terminal device, FIG. 5 is a simplified schematic structural diagram of a terminal device. For ease of understanding and convenience of figure illustration, an example in which the terminal device is a mobile phone is used in FIG. 5. As shown in FIG. 5, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store a software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; the radio frequency circuit performs radio frequency processing on the baseband signal and then sends the radio frequency signal outside in the form of the electromagnetic wave by using the antenna. When data is sent to the terminal device, the radio frequency circuit receives the radio frequency signal through the antenna, converts the radio frequency signal into the baseband signal, and outputs the baseband signal to the processor. The processor converts the baseband signal into data, and processes the data. For ease of description, FIG. 5 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment, the antenna and the radio frequency circuit that have receiving and sending functions may be considered as a transceiver unit of the terminal device, and the processor that has a processing function may be considered as a processing unit of the terminal device. As shown in FIG. 5, the terminal device includes a transceiver unit 501 and a processing unit 502. The transceiver unit may also be referred to as a transceiver, a transceiver, a transceiver apparatus, or the like. The processing unit may also be referred to as a processor, a processing board, a processing module, a processing apparatus, or the like. Optionally, a component configured to implement a receiving function in the transceiver unit 501 may be considered as a receiving unit, and a component configured to implement a sending function in the transceiver unit 501 may be considered as a sending unit. That is, the transceiver unit 501 includes the receiving unit and the sending unit. The transceiver unit sometimes may also be referred to as a transceiver, a transceiver, a transceiver circuit, or the like. The receiving unit sometimes may also be referred to as a receiver, a receiver, a receiving circuit, or the like. The sending unit sometimes may also be referred to as a transmitter, a transmitter, a transmitter circuit, or the like.

For example, in an implementation, the transceiver unit 501 is configured to perform a receiving operation of a terminal device side in step 220 or a sending operation of the terminal device side in step 240 that are in FIG. 2, and/or the transceiver unit 501 is further configured to perform another receiving and sending step of the terminal device side in the embodiments of this application. The processing unit 502 is configured to perform step 230 in FIG. 2, and/or the processing unit 502 is further configured to perform another processing step of the terminal device side in the embodiments of this application.

For another example, in another implementation, the transceiver unit 501 is configured to perform a receiving operation of a terminal device side in S32 and S36 or a sending operation of the terminal device side in S35 and S37 that are in FIG. 3, and/or the transceiver unit 502 is further configured to perform another receiving and sending step of the terminal device side in the embodiments of this application. The processing unit 502 is configured to perform S33 and S34 in FIG. 3, and/or the processing unit 502 is further configured to perform another processing step of the terminal device side in the embodiments of this application.

For another example, in another implementation, the transceiver unit 501 is configured to perform a receiving operation of a terminal device side in S41 and S45 or a sending operation of the terminal device side in S44 and S46 that are in FIG. 4, and/or the transceiver unit 501 is further configured to perform another receiving and sending step of the terminal device side in the embodiments of this application. The processing unit 502 is configured to perform S42, S43, and S47 in FIG. 4, and/or the processing unit 502 is further configured to perform another processing step of the terminal device side in the embodiments of this application.

When the first communications apparatus is a chip, the chip includes a transceiver unit and a processing unit. The transceiver unit may be an input/output circuit or a communications interface. The processing unit is a processor, a microprocessor, or an integrated circuit integrated on the chip.

An embodiment further provides a second communications apparatus. The second communications apparatus may be a network device or a chip. The second communications apparatus may be configured to perform actions performed by the network device in the foregoing method embodiments.

Figure 6:
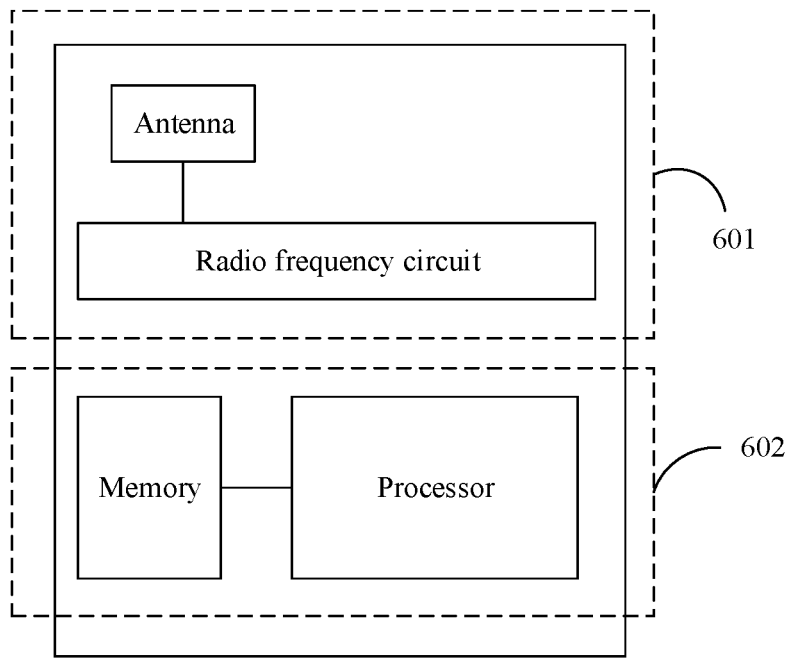
FIG. 6 is a schematic block diagram of a communications apparatus according to an embodiment of this application.

When the second communications apparatus is the network device, specifically, for example, a base station, FIG. 6 is a simplified schematic structural diagram of a base station. The base station includes a part 601 and a part 602. The part 601 is mainly configured to: receive and send a radio frequency signal, and perform conversion between the radio frequency signal and a baseband signal. The part 602 is mainly configured to: perform baseband processing, control the base station, and the like. The part 601 may usually be referred to as a transceiver unit, a transceiver, a transceiver circuit, a transceiver, or the like. The part 602 is usually a control center of the base station, and may usually be referred to as a processing unit, and is configured to control the base station to perform an action of generating a first message by the network device in the foregoing method embodiments. For details, refer to the foregoing descriptions of the related parts.

The transceiver unit of the part 601 may also be referred to as a transceiver, a transceiver, or the like. The transceiver unit includes an antenna and a radio frequency unit, and the radio frequency unit is mainly configured to perform radio frequency processing. Optionally, a component that is in the part 601 and that is configured to implement a receiving function may be considered as a receiving unit, and a component configured to implement a sending function may be considered as a sending unit. That is, the part 601 includes the receiving unit and the sending unit. The receiving unit may also be referred to as a receiver, a receiver, a receiver circuit, or the like. The sending unit may be referred to as a transmitter, a transmitter, a transmitter circuit, or the like.

The part 602 may include one or more boards. Each board may include one or more processors and one or more memories, and the processor is configured to read and execute a program in the memory, to implement a baseband processing function and control the base station. If there are a plurality of boards, the boards may be interconnected to enhance a processing capability. In an optional implementation, the plurality of boards may share the one or more processors, or the plurality of boards may share the one or more memories, or the plurality of boards simultaneously share the one or more processors.

For example, in an implementation, the transceiver unit is configured to perform a sending operation of a network device side in step 220 in FIG. 2, and/or the transceiver unit is further configured to perform another receiving and sending step of the network device side in the embodiments of this application. The processing unit is configured to perform an action of step 210, and/or the processing unit is further configured to perform another processing step of the network device side in the embodiments of this application.

For another example, in another implementation, the transceiver unit is configured to perform a sending operation of a network device side in S31 and S36 in FIG. 3, and/or other steps in this application. The processing unit is configured to perform S31 in FIG. 3.

For another example, in another implementation, the transceiver unit is configured to perform a sending operation of a network device side in S41 and S45 in FIG. 4, and/or other steps in this application. The processing unit is configured to generate the system message sent in S41 in FIG. 4.

When the second communications apparatus is a chip, the chip includes a transceiver unit and a processing unit. The transceiver unit may be an input/output circuit or a communications interface. The processing unit is a processor, a microprocessor, or an integrated circuit integrated on the chip.

For explanations and beneficial effects of related content in any of the foregoing provided communications apparatuses, refer to corresponding method embodiments provided above, and details are not described herein again.

It should be understood that the processor mentioned in the embodiments of this application may be a central processing unit (CPU), another general-purpose processor, a digital signal processor (DSP), an application-specific integrated circuit (ASIC), a field programmable gate array (FPGA), or another programmable logical device, discrete gate or transistor logical device, discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is the general-purpose processor, the DSP, the ASIC, the FPGA, or the another programmable logical device, discrete gate, transistor logical device, or discrete hardware component, the memory (storage module) is integrated into the processor.

It should be noted that the memory described in this specification includes but is not limited to these and any memory of another proper type.

A person of ordinary skill in the art may be aware that in combination with the examples described in the embodiments disclosed in this specification, units and algorithm steps may be implemented by electronic hardware or a combination of computer software and electronic hardware. Whether the functions are performed in a form of hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving a first message from a shared channel of a plurality of network slices, wherein the first message comprises a plurality of network identifiers IDs, and the plurality of network IDs are in a one-to-one correspondence with the plurality of network slices;
   selecting a target network slice from the plurality of network slices; and
   obtaining access configuration information of the target network slice from network configuration information, and accessing the target network slice based on the access configuration information of the target network slice, wherein the network configuration information comprises a network ID of each of the plurality of network slices and the access configuration information of the target network slice.

2. The method according to claim 1, wherein each of the plurality of network IDs further corresponds to a service type; and
   selecting a target network slice from the plurality of network slices comprises:
   selecting, as the target network slice, a network slice corresponding to a network ID that is in the plurality of network IDs and that corresponds to a service type of a current service.

3. The method according to claim 1, wherein the network configuration information comprises a mapping relationship between the network ID of each network slice and access configuration information of each network slice; and
   the access configuration information of the target network slice is access configuration information in the network configuration information and to which a network ID of the target network slice is mapped.

4. The method according to claim 1, wherein the first message further comprises access configuration information corresponding to each of the plurality of network IDs; and
   the network configuration information is generated based on the first message.

5. The method according to claim 1, wherein after the accessing the target network slice, the method further comprises:
   receiving a second message from a network side, wherein the second message carries data transmission configuration information, and the data transmission configuration information comprises resource pool information and transmission mode information; and
   performing data transmission with the target network slice based on the data transmission configuration information.

6. A communication method, comprising:
   generating a first message, wherein the first message comprises a plurality of network identifiers IDs, and the plurality of network IDs are in a one-to-one correspondence with a plurality of network slices; and
   sending the first message to a first communications apparatus by using a shared channel of the plurality of network slices, wherein the first message is used to indicate the first communications apparatus to select, from the plurality of network slices, a target network slice to be accessed, and the first communications apparatus has network configuration information, and the network configuration information comprises a network ID of each of the plurality of network slices and access configuration information of the target network slice.

7. The method according to claim 6, wherein each of the plurality of network IDs further corresponds to a service type; and
- the first message is further used to indicate the first communications apparatus to select, as the target network slice, a network slice corresponding to a network ID that is in the plurality of network IDs and that corresponds to a service type of a current service.

8. The method according to claim 6, wherein the network configuration information comprises a mapping relationship between the network ID of each network slice and access configuration information of each network slice; and
- the access configuration information of the target network slice is access configuration information that is comprised in the network configuration information and to which a network ID of the target network slice is mapped.

9. The method according to claim 6, wherein the first message further comprises access configuration information corresponding to each of the plurality of network IDs; and
- the network configuration information is generated based on the first message.

10. The method according to claim 6, wherein after accessing, by the first communications apparatus, the target network slice, the method further comprises:
- sending a second message to the first communications apparatus, wherein the second message carries data transmission configuration information, the data transmission configuration information comprises resource pool information and transmission mode information, and the second message is used to indicate the first communications apparatus to perform data transmission with the target network slice based on the data transmission configuration information.

11. The method according to claim 1, wherein the access configuration information comprises at least one of the following information: random access configuration information, a power control parameter, paging resource time-frequency location information, and physical random access channel PRACH configuration information; and
- the random access configuration information comprises at least one of the following information: information used to indicate a PRACH start carrier index, a start index and an end index of a common random access preamble preamble, information used to indicate a start carrier index and a carrier quantity that are of a physical downlink control channel PDCCH carrying downlink control information DCI corresponding to a random access response message, and configuration information of a plurality of PRACH resource groups, wherein each of the plurality of PRACH resource groups corresponds to one coverage level, and the configuration information of each PRACH resource group comprises the carrier quantity and/or a time domain repetition quantity;
- the power control parameter comprises at least one of the following information: an uplink power control parameter and a downlink power control parameter;
- the paging resource time-frequency location information comprises at least one of the following information: a default paging cycle, a start carrier index of a paging channel PCCH, and a PCCH carrier quantity; and
- the PRACH configuration information comprises at least one of the following information: a reference signal received power RSRP threshold, wherein the RSRP threshold is used to perform selection in PRACH resource groups corresponding to a plurality of coverage levels.

12. The method according to claim 5, wherein the data transmission configuration information comprises information about a data transmission mode of an uplink channel, and the information about the data transmission mode of the uplink channel comprises uplink scheduling information used to indicate a physical uplink shared channel PUSCH resource, or uplink non-scheduling information used to indicate that resource contention is performed in a pre-configured resource pool; and
- the uplink scheduling information comprises PDCCH configuration information and PRACH configuration information, wherein the PDCCH configuration information comprises at least one of the following information: a PDCCH start carrier index and a quantity of bound PDCCH carriers, and the PRACH configuration information comprises at least one of the following information: a PRACH start carrier index, a PRACH carrier quantity, and a start index and an end index of a preamble carrying a scheduling request SR; and
- the uplink non-scheduling information comprises physical uplink shared channel PUSCH configuration information and physical hybrid automatic repeat request indicator channel PHICH configuration information, and the PUSCH configuration information comprises at least one of the following information: a PUSCH start carrier index, a quantity of bound PUSCH carriers, a modulation and coding scheme MCS index, a time domain repetition quantity, a time domain repetition period, a time domain offset within a period, duration, and a Slot-Aloha contention window, and the PHICH configuration information comprises at least one of the following information: a PHICH start carrier index, an MCS index, and a feedback delay, wherein the feedback delay indicates a time interval between a PHICH feedback moment and a PUSCH sending moment.

13. The method according to claim 5, wherein the data transmission configuration information comprises information about a data transmission mode of a downlink channel, and the information about the data transmission mode of the downlink channel comprises downlink scheduling information used to indicate a physical downlink shared channel PDSCH resource, or downlink non-scheduling information used to indicate that PDSCH blind detection is performed in a resource pool; and
- the downlink scheduling information comprises PDCCH configuration information, and the PDCCH configuration information comprises at least one of the following information: a PDCCH start carrier index, a quantity of bound PDCCH carriers, a time domain repetition period, and a time domain offset within a period; and
- the downlink non-scheduling information comprises PDSCH configuration information and physical uplink control channel PUCCH configuration information, and the PDSCH configuration information comprises at least one of the following information: a PDSCH start carrier index, a quantity of bound PDSCH carriers, an MCS index, a time domain repetition quantity, a time domain repetition period, a time domain offset within a period, and duration, and the PUCCH configuration information comprises at least one of the following information: a PUCCH start carrier index and a time domain repetition quantity.

14. The method according to claim 1, wherein all the plurality of network slices are public land mobile network PLMN networks.

15. A communications apparatus, comprising:
- a transceiver unit, configured to receive a first message from a shared channel of a plurality of network slices, wherein the first message comprises a plurality of network identifiers IDs, and the plurality of network IDs are in a one-to-one correspondence with the plurality of network slices; and
- a processing unit, configured to select a target network slice from the plurality of network slices, wherein
- the processing unit is further configured to: obtain access configuration information of the target network slice from network configuration information, and access the target network slice based on the access configuration information of the target network slice, wherein the network configuration information comprises a network ID of each of the plurality of network slices and the access configuration information of the target network slice.

16. The communications apparatus according to claim 15, wherein each of the plurality of network IDs further corresponds to a service type; and
- the processing unit is specifically configured to select, as the target network slice, a network slice corresponding to a network ID that is in the plurality of network IDs and that corresponds to a service type of a current service.

17. The communications apparatus according to claim 15, wherein the network configuration information comprises a mapping relationship between the network ID of each network slice and access configuration information of each network slice; and
- the access configuration information of the target network slice is access configuration information that is comprised in the network configuration information and to which a network ID of the target network slice is mapped.

18. The communications apparatus according to claim 15, wherein the first message further comprises access configuration information corresponding to each of the plurality of network IDs; and
- the network configuration information is generated based on the first message.

19. The communications apparatus according to claim 15, wherein the transceiver unit is further configured to receive a second message from a network side after the communications apparatus accesses the target network slice, wherein the second message carries data transmission configuration information, and the data transmission configuration information comprises resource pool information and transmission mode information; and
- the transceiver unit is further configured to perform data transmission with the target network slice based on the data transmission configuration information.

* * * * *

UNITED STATES PATENT AND TRADEMARK OFFICE
CERTIFICATE OF CORRECTION

PATENT NO. : 11,265,803 B2
APPLICATION NO. : 16/987456
DATED : March 1, 2022
INVENTOR(S) : Jun Zhang et al.

It is certified that error appears in the above-identified patent and that said Letters Patent is hereby corrected as shown below:

In the Claims

In Column 29, Line 47, Claim 11, delete "preamble preamble," and insert -- preamble, --.

Signed and Sealed this
Seventh Day of June, 2022

Katherine Kelly Vidal
*Director of the United States Patent and Trademark Office*